(12) United States Patent
Liao et al.

(10) Patent No.: US 11,773,304 B2
(45) Date of Patent: Oct. 3, 2023

(54) POLYURETHANE ADHESIVE AND MIXTURE USED FOR MANUFACTURING PLASTIC ATHLETIC TRACK

(71) Applicant: NAN YA PLASTICS CORPORATION, Taipei (TW)

(72) Inventors: Te-Chao Liao, Taipei (TW); Han-Ching Hsu, Taipei (TW); Chen-Wei Chang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 660 days.

(21) Appl. No.: 16/727,761

(22) Filed: Dec. 26, 2019

(65) Prior Publication Data

US 2021/0054250 A1 Feb. 25, 2021

(30) Foreign Application Priority Data

Aug. 20, 2019 (TW) ................. 108129637

(51) Int. Cl.
| | |
|---|---|
| *C09J 175/08* | (2006.01) |
| *C09J 7/30* | (2018.01) |
| *C08G 18/12* | (2006.01) |
| *C08K 5/00* | (2006.01) |
| *C08G 18/48* | (2006.01) |
| *C08K 5/13* | (2006.01) |
| *C08K 5/521* | (2006.01) |
| *C08K 5/3475* | (2006.01) |
| *C08K 5/09* | (2006.01) |

(52) U.S. Cl.
CPC ............ *C09J 175/08* (2013.01); *C08G 18/12* (2013.01); *C08G 18/4841* (2013.01); *C08G 18/4845* (2013.01); *C08K 5/005* (2013.01); *C08K 5/09* (2013.01); *C08K 5/13* (2013.01); *C08K 5/3475* (2013.01); *C08K 5/521* (2013.01); *C09J 7/30* (2018.01)

(58) Field of Classification Search
CPC .................................................. C09J 175/08
See application file for complete search history.

(56) References Cited

U.S. PATENT DOCUMENTS

| 5,354,837 A | 10/1994 | Watanabe |
| 5,925,781 A | 7/1999 | Pantone et al. |
| 2019/0270918 A1 | 9/2019 | Seehagen et al. |

FOREIGN PATENT DOCUMENTS

| CN | 1243137 A | 2/2000 |
| CN | 101130680 A | 2/2008 |
| CN | 107936287 A | 4/2018 |
| CN | 109996827 A | 7/2019 |

OTHER PUBLICATIONS

English Machine Translation for CN101130680 (A) obtained http://translationportal.epo.org/emtp/translate/?ACTION=claims-retrieval&COUNTRY=CN&ENGINE=google&FORMAT=docdb&KIND=A&LOCALE=en_EP&NUMBER=101130680&OPS=ops.epo.org/3.2&SRCLANG=zh&TRGLANG=en (Year: 2008).*
Li Shaoxiong,Liu Yijun, "polyurethane adhesive", Chemical Industry Press, Aug. 31, 1998,pp. 23-29.
Cheng Zeng-Yue, "Handbook of Practical Techniques for Common Resins (first edition)",China Petrochemical Press, Nov. 30, 1999,pp. 553-557.
"Quality and life", Inner Mongolia Highway Quality and Technical Supervision Bureau, Dec. 31, 2018, pp. 109-110, www.junshilei.cn/n/dsrqw/book/base/14481700.

* cited by examiner

*Primary Examiner* — Arrie L Reuther
(74) *Attorney, Agent, or Firm* — Li & Cai Intellectual Property (USA) Office

(57) ABSTRACT

A polyurethane adhesive and a mixture used for manufacturing a plastic athletic track are provided. The polyurethane adhesive includes a urethane pre-polymer which is formed by a reaction between an isocyanate and a polyol. The polyol is selected from the group consisting of polyether polyol and polybutadiene polyol, and a number average molecular weight of the polyol is between 1,000 g/mole and 6,000 g/mole. Based on the total weight of the polyurethane adhesive, a content of the urethane pre-polymer is between 80 wt % and 99.5 wt %, and a viscosity of the polyurethane adhesive is between 1,000 cps and 3,000 cps under an environmental temperature of between 15° C. and 40° C.

10 Claims, No Drawings

POLYURETHANE ADHESIVE AND MIXTURE USED FOR MANUFACTURING PLASTIC ATHLETIC TRACK

CROSS-REFERENCE TO RELATED PATENT APPLICATION

This application claims the benefit of priority to Taiwan Patent Application No. 108129637, filed on Aug. 20, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyurethane adhesive, and more particularly to a polyurethane adhesive and a mixture used for manufacturing a plastic athletic track.

BACKGROUND OF THE DISCLOSURE

Conventional adhesives used for manufacturing plastic athletic tracks are mainly two-component polyurethane adhesives (also called two-liquid type polyurethane adhesive). Although a one-component adhesive (also called single-liquid type polyurethane adhesive) is used, the one-component adhesive may cause many problems due to the addition of a chain extender. For example, the plastic particles used for manufacturing the plastic athletic track are not easily wetted due to the high viscosity of the adhesive. Further, when a mixture formed by mixing the adhesive with the plastic particles (i.e., rubber particles) is coated on a road surface, the mixture is difficult to level and has poor uniformity of thickness. In addition, after the adhesive is solidified or cured, the plastic particles are easily peeled off from each other due to poor adhesion. Based on the above problems, the plastic athletic tracks made by the conventional adhesives have defects of poor quality and short service life. That is, the conventional polyurethane adhesives have defects that: the viscosity of the adhesive is too high, the plastic particles are not easily wetted completely, and the available construction time is short. Furthermore, since the conventional polyurethane adhesives include harmful substances such as plasticizers, chain extenders, and volatile organic solvents, most of the conventional polyurethane adhesives do not meet environmental requirements.

SUMMARY OF THE DISCLOSURE

In response to the above-referenced technical inadequacies, the present disclosure provides a polyurethane adhesive and a mixture used for manufacturing a plastic athletic track.

In one aspect, the present disclosure provides a polyurethane adhesive used for manufacturing a plastic athletic track. The polyurethane adhesive includes: a urethane pre-polymer formed by a reaction between an isocyanate and a polyol. The polyol is at least one selected from the group consisting of polyether polyol and polybutadiene polyol, and a number average molecular weight of the polyol is between 1,000 g/mole and 6,000 g/mole. Based on the total weight of the polyurethane adhesive, a content of the urethane pre-polymer is between 80 wt % and 99.5 wt %, and a viscosity of the polyurethane adhesive is between 1,000 cps and 3,000 cps under an environmental temperature of between 15° C. and 40° C.

Preferably, the urethane pre-polymer is formed by reacting an isocyanate group (—NCO) of the isocyanate with a hydroxyl group (—OH) of the polyol based on a molar ratio of NCO:OH between 3:1 and 6:1.

Preferably, the polyether polyol is at least one selected from the group consisting of polyoxyethylene polyol, polyoxypropylene polyol, and polyoxyethylene polyoxypropylene copolymer polyol.

Preferably, a molecular structure of the polyol has a hydroxyl functional group, and an average functionality of the polyol is between 2 and 3; wherein a side chain of the molecular structure of the polyol further has an amino functional group (—NH$_2$) capable of reacting with an isocyanate group (—NCO) of the isocyanate.

Preferably, the molecular structure of the polyol has at least one of methyl functional group, methylene functional group, and vinyl functional group.

Preferably, the polyurethane adhesive further includes an antioxidant, an ultraviolet absorber, and a polymerization inhibitor. Based on the total weight of the polyurethane adhesive, a content of the antioxidant is between 0.1 wt % and 1.0 wt %, a content of the ultraviolet absorber is between 0.1 wt % and 0.6 wt %, and a content of the polymerization inhibitor is between 0.05 wt % and 0.5 wt %.

Preferably, the antioxidant is at least one selected from the group consisting of esters of β-(3,5-di-tert-butyl-4-hydroxyphenyl)-propionic acid, di-butylhydroxytoluene, and phosphorous ester. The ultraviolet absorber is at least one selected from the group consisting of 2-hydroxy-4-n-octyloxy-benzo-phenone, 2-(2'-hydroxy-3',5'-di-tert-phenyl) 5-chloro-benzotriazole, and 4-benzyl-ideneoxy-2,2,6,6-tetramethylacridine. The polymerization inhibitor is at least one selected from the group consisting of benzoic acid and benzoyl chloride.

Preferably, the composition of the polyurethane adhesive does not include any chain extender, plasticizer, and volatile organic solvent.

Preferably, the number average molecular weight of the polyol is between 2,000 g/mole and 5,000 g/mole. Based on the total weight of the polyurethane adhesive, the content of the urethane pre-polymer is between 90 wt % and 99.5 wt %, and the viscosity of the polyurethane adhesive is between 1,500 cps and 2,500 cps under the environmental temperature of between 15° C. and 40° C.

In one aspect, the present disclosure provides a mixture used for manufacturing a plastic athletic track. The mixture includes a polyurethane adhesive and a plurality of plastic particles. The polyurethane adhesive includes a urethane pre-polymer formed by a reaction between an isocyanate and a polyol. The polyol is at least one selected from the group consisting of polyether polyol and polybutadiene polyol, and a number average molecular weight of the polyol is between 1,000 g/mole and 6,000 g/mole. Based on the total weight of the polyurethane adhesive, a content of the urethane pre-polymer is between 80 wt % and 99.5 wt %, and a viscosity of the polyurethane adhesive is between 1,000 cps and 3,000 cps under an environmental temperature of between 15° C. and 40° C. The plurality of plastic particles are mixed in the polyurethane adhesive, the plurality of plastic particles have an average particle size of between 1 mm and 10 mm, the plurality of plastic particles are at least one selected from the group consisting of rubber particles and polyurethane particles, and a mixing ratio of the plurality of plastic particles to the polyurethane adhesive is between 4:1 and 10:1 by weight.

Preferably, the mixture is capable of being coated on a flat road surface to form a coating layer having a thickness of between 0.3 cm and 1.2 cm, and the coating layer is capable of being solidified to form a plastic athletic track under the environmental temperature of between 15° C. and 40° C. and over 12 hours.

Preferably, the urethane pre-polymer is formed by reacting an isocyanate group (—NCO) of the isocyanate with a hydroxyl group (—OH) of the polyol based on a molar ratio of NCO:OH between 3:1 and 6:1.

Preferably, the polyether polyol is at least one selected from the group consisting of polyoxyethylene polyol, polyoxypropylene polyol, and polyoxyethylene polyoxypropylene copolymer polyol.

Preferably, a molecular structure of the polyol has a hydroxyl functional group, and an average functionality of the polyol is between 2 and 3; wherein a side chain of the molecular structure of the polyol further has an amino functional group (—NH$_2$) capable of reacting with an isocyanate group (—NCO) of the isocyanate.

Therefore, the polyurethane adhesive of the present disclosure can be in a liquid state under a normal temperature condition through the technical features of "the polyol is at least one selected from the group consisting of polyether polyol and polybutadiene polyol", "a number average molecular weight of the polyol is between 1,000 g/mole and 6,000 g/mole", and "based on the total weight of the polyurethane adhesive, a content of the urethane pre-polymer is between 80 wt % and 99.5 wt %, and a viscosity of the polyurethane adhesive is between 1,000 cps and 3,000 cps under an environmental temperature of between 15° C. and 40° C.". Moreover, the polyurethane adhesive of the present disclosure can have a low viscosity and a long operation time, thereby facilitating the wetting of the plastic particles, and improving on the problem of short available construction time and difficulties in construction.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Polyurethane Adhesive

An embodiment of the present disclosure provides a polyurethane adhesive, and the polyurethane adhesive of the present embodiment is preferably a one-component polyurethane adhesive (also called single-liquid type polyurethane adhesive). That is, the polyurethane adhesive of the present embodiment can be directly used to adhere materials that require adhering without the additional use of any hardening agent.

In addition, the polyurethane adhesive of the present embodiment is particularly suitable for use in manufacturing a plastic athletic track (also called plastic runway). More specifically, the polyurethane adhesive of the present embodiment is particularly suitable for use in adhering plastic particles, such as rubber particles or polyurethane particles, so as to form a plastic athletic track which has good adhesion, good resilience and soft hand feeling after the adhesive is solidified or cured.

In order to achieve the above object, the polyurethane adhesive of the present embodiment can be in a liquid state under a normal temperature condition through the selections of materials and composition ratio, and the polyurethane adhesive can have a low viscosity and a long operation time, thereby facilitating the wetting of the plastic particles and increasing the bonding strength between the plastic particles.

More specifically, in the present embodiment, the main composition of the polyurethane adhesive is urethane pre-polymer. Other additives, such as antioxidants, ultraviolet absorbers and polymerization inhibitors, may be added in the polyurethane adhesive depending on product design requirements.

Further, the urethane pre-polymer is formed by a reaction between an isocyanate and a polyol.

In order to enable the polyurethane adhesive to provide better adhesion to the plastic particles (i.e. rubber particles or polyurethane particles), the polyol has preferred types of materials. More specifically, the polyol is at least one selected from the group consisting of polyether polyol and polybutadiene polyol.

The polyether polyol is at least one selected from the group consisting of polyoxyethylene polyol, polyoxypropylene polyol, and polyoxyethylene polyoxypropylene copolymer polyol.

In order to enable the polyurethane adhesive to be in the liquid state under the normal temperature condition, and to enable the polyurethane adhesive to have a low viscosity and a long operation time, the polyol has a preferred molecular weight range. More specifically, a number average molecular weight of the polyol is generally between 1,000 g/mole and 6,000 g/mole, preferably between 2,000 g/mole and 5,000 g/mole, and more preferably between 3,000 g/mole and 4,000 g/mole.

In addition, the polyol has a preferred content range in the polyurethane adhesive. More specifically, based on the total weight of the polyurethane adhesive, a content of the urethane pre-polymer is generally between 80 wt % and 99.5 wt %, preferably between 90 wt % and 99.5 wt %, and more preferably between 95 wt % and 99.5 wt %.

According to the above-mentioned selections of material type, average molecular weight, and content range, a viscosity of the polyurethane adhesive is generally between 1,000 cps and 3,000 cps, preferably between 1,500 cps and 2,500 cps, and more preferably between 1,750 cps and 2,250 cps under the environmental temperature of between 15° C. and 40° C.

That is, the polyurethane adhesive can be produced according to the selections of the material type and the average molecular weight of the polyol and the adjustment of the content range of the urethane pre-polymer. Accordingly, the polyurethane adhesive of the present embodiment can achieve the characteristics of low viscosity and long operation time (long curing time). In addition, the polyurethane adhesive of the present embodiment can be in a flowable liquid state under the normal temperature condition.

It is worth mentioning that if the average molecular weight of the polyol is lower or higher than the range defined above, the polyurethane adhesive will not achieve the desired physicochemical properties. For example, if the average molecular weight of the polyol is lower than the range defined above (i.e. the average molecular weight is less than 1,000 g/mole), the viscosity of the polyurethane adhesive will be too high, so that the wettability of the adhesive to the plastic particles is deteriorated, which may cause problems in construction.

Further, it is worth mentioning that the isocyanate used in the synthesis of the urethane pre-polymer is preferably 4,4'-diphenylmethane diisocyanate (MDI), but the present disclosure is not limited thereto. For example, the isocyanate may include, but is not limited to, an aromatic polyisocyanate, such as 4,4'-diphenylmethane diisocyanate (MDI), 2,2'-diphenylmethane diisocyanate, diphenylmethane 2,4'-diisocyanate, 1,3-phenylene diisocyanate, 1,4-phenylene diisocyanate, naphthalene-1,5-diisocyanate (NDI), toluene diisocyanate (TDI), tetramethyl xylene diisocyanate, toluene diisocyanate, naphthalene, di- and tetraalkyl diphenylmethane diisocyanate, 4,4'-dibenzyl diisocyanate, and combinations thereof. In addition, the isocyanate may also include, but is not limited to, an aliphatic isocyanate, such as dodecane diisocyanate, dimer fatty acid diisocyanate, 4,4'-dibenzyl diisocyanate, 1,6-diisocyanato-2,4,4-trimethylhexane, 1,4-diisocyanate, 1,6-diisocyanohexyl (HDI), 1,4-diisocyanotetramethane, dicyclohexanemethane diisocyanate, 1,12-diisocyanatododecane, cyclic diisocyanate, 4,4-dicyclohexanemethane diisocyanate, 1,3-cyclohexane, 1,4-cyclohexane diisocyanate, 1-methyl-2,4-diisocyanatocyclohexane, 1-iso cyanomethyl-3-isocyano-1,5,5-trimethyl-cyclohexane (IPDI), hydrogenated or partially hydrogenated MDI, xylene diisocyanate (XDI), tetramethylxylene diisocyanate (TMXDI), di- and tetraalkylenediphenylmethane diisocyanate, and combinations thereof.

In a preferred embodiment of the present disclosure, in order to enable the polyurethane adhesive to achieve the desired physicochemical properties (i.e. viscosity characteristics), the urethane pre-polymer is formed by reacting an isocyanate group (—NCO) of the isocyanate with a hydroxyl group (—OH) of the polyol based on a molar ratio of NCO:OH between 3:1 and 6:1, and preferably between 4:1 and 5:1.

In a preferred embodiment of the present disclosure, a molecular structure of the polyol has a hydroxyl functional group, and an average functionality of the polyol is between 2 and 3. Further, a side chain of the molecular structure of the polyol further has an amino functional group (—NH$_2$) capable of reacting with the isocyanate group (—NCO) of the isocyanate. Therefore, a reaction rate between the isocyanate and the polyol can be increased, and the synthesis of the urethane pre-polymer can be more efficient. In addition, since the urethane pre-polymer has the amino functional group, the adhesion of the urethane pre-polymer to the plastic particles, such as rubber particles or polyurethane particles, can also be improved.

In a preferred embodiment of the present disclosure, the polyol has one or more methyl functional groups, methylene functional groups, or vinyl functional groups in its molecular structure.

In a preferred embodiment of the present disclosure, in order to enhance the physicochemical properties of the polyurethane adhesive so as to enable the resulting plastic athletic track to have a better quality (i.e. weather resistance), the polyurethane adhesive may be selectively added with one or more additives, such as an antioxidant, an ultraviolet absorber (also called UV absorber), and a polymerization inhibitor.

In terms of material selections of the additives, the antioxidant is at least one selected from the group consisting of esters of β-(3,5-di-tert-butyl-4-hydroxyphenyl)-propionic acid, di-butylhydroxytoluene, and phosphorous ester. Further, the ultraviolet absorber is at least one selected from the group consisting of 2-hydroxy-4-n-octyloxy-benzo-phenone, 2-(2'-hydroxy-3',5'-di-tert-phenyl) 5-chloro-benzotriazole, and 4-benzyl-ideneoxy-2,2,6,6-tetramethylacridine. In addition, the polymerization inhibitor is at least one selected from the group consisting of benzoic acid and benzoyl chloride.

In terms of content ranges of the additives, based on the total weight of the polyurethane adhesive, a content of the antioxidant is preferably between 0.1 wt % and 1.0 wt %, a content of the ultraviolet absorber is preferably between 0.1 wt % and 0.6 wt %, and a content of the polymerization inhibitor is preferably between 0.05 wt % and 0.5 wt %.

It is worth mentioning that the antioxidant can prevent the rubber particles from aging, degrading, or vulcanizing after prolonged exposure to sunlight. Further, the ultraviolet absorber can absorb ultraviolet rays in sunlight and prevent the rubber particles from aging. Moreover, the polymerization inhibitor can prevent the polymerization of the polyurethane adhesive during storage or transportation, thereby improving the storage stability of the adhesive product.

In addition, according to the above-mentioned material selections and content ranges, the polyurethane adhesive of the present embodiment can be directly used for adhering the plastic particles, such as rubber particles or polyurethane particles, without adding any chain extender, plasticizer, and volatile organic solvent. Therefore, the resulting plastic athletic track can meet environmental requirements, and the impact of the plastic athletic track on the environment and human health can be effectively reduced.

The chain extender may be, for example but not limited to, diphenyl-methane-diamine (MOCA), ethylene glycol, diethylene glycol, and butylene glycol. The plasticizer may be, for example but not limited to, dioctyl phthalate, dibutyl phthalate, and diisononyl 1,2-cyclohexanedicarboxylate.

The volatile organic solvent may be, for example but not limited to, toluene, acetone, and ethyl acetate.

It is worth mentioning that the conventional adhesives used for manufacturing the plastic athletic track have the problems that the plastic particles are not easily wetted and the construction time is short since the viscosity of the conventional adhesives is too high or the viscosity of the adhesives will climb during construction. Compared with the conventional adhesives used for manufacturing the plastic athletic track, the polyurethane adhesive of the present embodiment can be in a liquid state under a normal temperature condition, has a low viscosity and a long operation time through the material selections and the content ranges. The characteristics of the adhesive of the present embodiment facilitate the wettability of the plastic particles, and can improve the problems that the construction time is short and the construction process is difficult.

Material Properties Test of Polyurethane Adhesive

The polyurethane adhesive of the present embodiment has a significant difference in the physicochemical properties from the commercially available polyurethane adhesives, and the test results are shown in Table 1 below.

TABLE 1

| | | commercially available polyurethane adhesives | polyurethane adhesive of the present embodiment |
|---|---|---|---|
| viscosity (cps) | | 2,880-3,250 | 1,950 |
| -NCO (%) | | 10.3-10.8 | 10.2 |
| film tensile test (room temperature matured for 2 days) | 100% modulus (kg/cm$^2$) | 52-57 | 50 |
| | breaking strength (kg/cm$^2$) | 165-180 | 194 |
| | elongation (%) | 438-575 | 650 |

As shown in Table 1, the viscosity of the polyurethane adhesive of the present embodiment is lower than that of the conventional commercially available polyurethane adhesive, and thus the polyurethane adhesive of the present embodiment is more advantageous for the wetting of the plastic particles.

Further, after the polyurethane adhesive of the present embodiment is formed into a film shape and tested, it can be observed that the film made from the polyurethane adhesive of the present embodiment has a lower 100% modulus, a higher breaking strength, and a higher elongation than that of the film made of the commercially available polyurethane adhesive through a film tensile test. That is, the polyurethane adhesive of the present embodiment enable the final product of the plastic athletic track to have soft hand feeling after the polyurethane adhesive is solidified or cured.

Manufacture of Plastic Athletic Track

The material composition and physicochemical properties of the polyurethane adhesive of the present embodiment are described above, and the following will continue to describe how the polyurethane adhesive can be applied to the manufacturing of a plastic athletic track.

An embodiment of the present disclosure also provides a mixture used for manufacturing a plastic athletic track. The mixture includes a polyurethane adhesive and a plurality of plastic particles.

The polyurethane adhesive includes a urethane pre-polymer formed by a reaction between an isocyanate and a polyol. The polyol is at least one selected from the group consisting of polyether polyol and polybutadiene polyol, and a number average molecular weight of the polyol is between 1,000 g/mole and 6,000 g/mole. Based on the total weight of the polyurethane adhesive, a content of the urethane pre-polymer is between 80 wt % and 99.5 wt %, and a viscosity of the polyurethane adhesive is between 1,000 cps and 3,000 cps under an environmental temperature of between 15° C. and 40° C.

The plastic particles are mixed in the polyurethane adhesive. The plastic particles have an average particle size of between 1 mm and 10 mm, and preferably between 1 mm and 5 mm. The plastic particles are at least one selected from the group consisting of rubber particles (i.e. EPDM rubber particles or SBR rubber particles) and polyurethane particles. In addition, a mixing ratio of the plastic particles to the polyurethane adhesive is between 4:1 and 10:1 by weight, and preferably between 6:1 and 8:1 by weight.

In order to manufacture the plastic athletic track, the mixture is capable of being coated on a flat road surface to form a coating layer having a thickness of between 0.3 cm and 1.2 cm, and the coating layer is capable of being solidified to form the plastic athletic track under the environmental temperature of between 15° C. and 40° C. and over 12 hours.

The purpose of the present disclosure is to control the viscosity of the polyurethane adhesive without adding toxic chemicals, containing no volatile organic solvents, and having a simple process, so that the polyurethane adhesive of the present embodiment is environmentally friendly, efficient, and energy-saving. The polyurethane adhesive and the mixture of the present embodiment are used for the ground construction of a runway or a ball court, and have the technical advantages of long construction time, easy construction, good adhesion between the plastic particles after hardening, and low hardness.

Advantageous Effects

In conclusion, the beneficial effect of the present disclosure is that the polyurethane adhesive can be in a liquid state under a normal temperature condition through the technical features of "the polyol is at least one selected from the group consisting of polyether polyol and polybutadiene polyol", "a number average molecular weight of the polyol is between 1,000 g/mole and 6,000 g/mole", and "based on the total weight of the polyurethane adhesive, a content of the urethane pre-polymer is between 80 wt % and 99.5 wt %, and a viscosity of the polyurethane adhesive is between 1,000 cps and 3,000 cps under an environmental temperature of between 15° C. and 40° C.". Moreover, the polyurethane adhesive of the present disclosure can have a low viscosity and a long operation time, thereby facilitating the wettability of the plastic particles, and improving on the problem of short available construction time or difficulties in construction.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polyurethane adhesive, characterized in that the polyurethane adhesive comprises:
   a urethane pre-polymer formed by a reaction between an isocyanate and a polyol;
   wherein the polyol is at least one selected from the group consisting of polyether polyol and polybutadiene polyol, and a number average molecular weight of the polyol is between 1,000 g/mole and 6,000 g/mole;
   wherein the urethane pre-polymer is formed by reacting an isocyanate group (—NCO) of the isocyanate with a hydroxyl group (—OH) of the polyol based on a molar ratio of NCO:OH between 3:1 and 6:1;
   wherein based on the total weight of the polyurethane adhesive, a content of the urethane pre-polymer is between 90 wt % and 99.5 wt %, and a viscosity of the polyurethane adhesive is between 1,500 cps and 2,500 cps under an environmental temperature of between 15° C. and 40° C.;
   wherein a molecular structure of the polyol has a hydroxyl functional group, and an average functionality of the polyol is between 2 and 3; wherein a side chain of the molecular structure of the polyol further has an amino functional group (—NH$_2$) capable of reacting with an isocyanate group (—NCO) of the isocyanate; wherein the polyurethane adhesive is used for manufacturing a plastic athletic track.

2. The polyurethane adhesive according to claim 1, wherein the polyether polyol is at least one selected from the group consisting of polyoxyethylene polyol, polyoxypropylene polyol, and polyoxyethylene polyoxypropylene copolymer polyol.

3. The polyurethane adhesive according to claim 1, wherein the molecular structure of the polyol has at least one of methyl functional group, methylene functional group, and vinyl functional group.

4. The polyurethane adhesive according to claim 1, further comprising: an antioxidant, an ultraviolet absorber, and a polymerization inhibitor; wherein based on the total weight of the polyurethane adhesive, a content of the antioxidant is between 0.1 wt % and 1.0 wt %, a content of the ultraviolet absorber is between 0.1 wt % and 0.6 wt %, and a content of the polymerization inhibitor is between 0.05 wt % and 0.5 wt %.

5. The polyurethane adhesive according to claim 4, wherein the antioxidant is at least one selected from the group consisting of esters of β-(3,5-di-tert-butyl-4-hydroxyphenyl)-propionic acid, di-butylhydroxytoluene, and phosphorous ester; wherein the ultraviolet absorber is at least one selected from the group consisting of 2-hydroxy-4-n-octyloxy-benzo-phenone, 2-(2'-hydroxy-3',5'-di-tert-phenyl) 5-chloro-benzotriazole, and 4-benzyl-ideneoxy-2,2,6,6-tetramethylacridine; wherein the polymerization inhibitor is at least one selected from the group consisting of benzoic acid and benzoyl chloride.

6. The polyurethane adhesive according to claim 1, wherein the composition of the polyurethane adhesive does not include any chain extender, plasticizer, and volatile organic solvent.

7. The polyurethane adhesive according to claim 1, wherein the number average molecular weight of the polyol is between 2,000 g/mole and 5,000 g/mole; wherein based on the total weight of the polyurethane adhesive, the content of the urethane pre-polymer is between 90 wt % and 99.5 wt %, and the viscosity of the polyurethane adhesive is between 1,500 cps and 2,500 cps under the environmental temperature of between 15° C. and 40° C.

8. A mixture, characterized in that the mixture comprises:
   a polyurethane adhesive including a urethane pre-polymer formed by a reaction between an isocyanate and a polyol; wherein the polyol is at least one selected from the group consisting of polyether polyol and polybutadiene polyol, and a number average molecular weight of the polyol is between 1,000 g/mole and 6,000 g/mole; wherein the urethane pre-polymer is formed by reacting an isocyanate group (—NCO) of the isocyanate with a hydroxyl group (—OH) of the polyol based on a molar ratio of NCO:OH between 3:1 and 6:1; wherein based on the total weight of the polyurethane adhesive, a content of the urethane pre-polymer is between 90 wt % and 99.5 wt %, and a viscosity of the polyurethane adhesive is between 1,500 cps and 2,500 cps under an environmental temperature of between 15° C. and 40° C.; and
   a plurality of plastic particles mixed in the polyurethane adhesive; wherein the plurality of plastic particles have an average particle size of between 1 mm and 10 mm, the plurality of plastic particles are at least one selected from the group consisting of rubber particles and polyurethane particles, and a mixing ratio of the plurality of plastic particles to the polyurethane adhesive is between 4:1 and 10:1 by weight;
   wherein a molecular structure of the polyol has a hydroxyl functional group, and an average functionality of the polyol is between 2 and 3; wherein a side chain of the molecular structure of the polyol further has an amino functional group (—NH$_2$) capable of reacting with an isocyanate group (—NCO) of the isocyanate; wherein the mixture is used for manufacturing a plastic athletic track.

9. The mixture according to claim 8, wherein the mixture is capable of being coated on a flat road surface to form a coating layer having a thickness of between 0.3 cm and 1.2 cm, and the coating layer is capable of being solidified to form a plastic athletic track under the environmental temperature of between 15° C. and 40° C. and over 12 hours.

10. The mixture according to claim 8, wherein the polyether polyol is at least one selected from the group consisting of polyoxyethylene polyol, polyoxypropylene polyol, and polyoxyethylene polyoxypropylene copolymer polyol.

* * * * *